(12) United States Patent
Gavin

(10) Patent No.: US 9,233,323 B1
(45) Date of Patent: Jan. 12, 2016

(54) T-HOUSING FOR SEPTIC TANK

(75) Inventor: Peter W. Gavin, Durham, CT (US)

(73) Assignee: Peter W. Gavin, Durham, CT (US)

( * ) Notice: Subject to any disclaimer, the term of this patent is extended or adjusted under 35 U.S.C. 154(b) by 584 days.

(21) Appl. No.: 11/055,426

(22) Filed: Feb. 10, 2005

Related U.S. Application Data

(60) Provisional application No. 60/545,099, filed on Feb. 17, 2004.

(51) Int. Cl.
| | |
|---|---|
| *B01D 29/23* | (2006.01) |
| *B01D 29/35* | (2006.01) |
| *B01D 35/027* | (2006.01) |
| *F16L 5/00* | (2006.01) |
| *C02F 3/28* | (2006.01) |

(52) U.S. Cl.
CPC .................. *B01D 35/027* (2013.01); *F16L 5/00* (2013.01); *B01D 29/23* (2013.01); *B01D 29/35* (2013.01); *C02F 3/288* (2013.01)

(58) Field of Classification Search
USPC .............. 210/282, 237, 236, 172.6, 453, 447, 210/448, 449, 484, 462; 220/301, 300, 326, 220/345.3, 302; 72/402, 730, 399
See application file for complete search history.

(56) References Cited

U.S. PATENT DOCUMENTS

| | | | |
|---|---|---|---|
| 3,025,962 A | | 3/1962 | Williams |
| 3,332,552 A | | 7/1967 | Zabel |
| 3,602,531 A | * | 8/1971 | Patry ........................ 285/148.23 |
| 3,915,481 A | * | 10/1975 | Marsh, Jr. ................. 285/148.23 |
| 4,675,965 A | * | 6/1987 | Offringa et al. ............... 264/261 |
| 4,865,738 A | | 9/1989 | Black, Jr. et al. |
| 4,871,455 A | | 10/1989 | Terhune et al. |
| 5,299,839 A | * | 4/1994 | Mogavero ...................... 285/110 |
| 5,360,240 A | * | 11/1994 | Mott ............................... 285/95 |
| 5,409,604 A | | 4/1995 | Graves |
| 5,482,621 A | * | 1/1996 | Nurse ...................... 210/170.08 |
| 5,577,779 A | * | 11/1996 | Dangel ........................... 292/80 |
| 5,683,577 A | | 11/1997 | Nurse, Jr. |
| 5,725,621 A | | 3/1998 | Pruette et al. |
| 5,885,452 A | * | 3/1999 | Koteskey ...................... 210/309 |
| 5,985,139 A | | 11/1999 | Zoeller |
| 6,338,797 B1 | * | 1/2002 | Nurse et al. ................... 210/238 |
| 6,360,898 B1 | * | 3/2002 | Nurse et al. ................... 210/435 |
| 6,495,040 B1 | * | 12/2002 | Zoeller et al. ................. 210/299 |

OTHER PUBLICATIONS

Zabel, advertisement, "World Leader in onsite wastewater filtration" Downloaded from internet at www.Zabelzone.com on Jan. 26, 2004 by Robert A. Seemann, 6 Pages.

* cited by examiner

*Primary Examiner* — Benjamin Kurtz
(74) *Attorney, Agent, or Firm* — Wiggin and Dana LLP; Anthony P. Gangemi

(57) ABSTRACT

The bottom annular end of a vertical collar that extends into the vertical tubular portion of a T-housing and is fastened therein by resilient fingers extending radially outward from the collar, is contacted by a resilient finger of a filter inserted through the collar into the tubular portion, a radially inward extending shoulder in the collar is contacted by the bottom of an annular horizontal plate on the filter, and a liquid level alarm system housing is attached to the outer surface of the vertical tubular portion by a plurality of vertically spaced apart catches or studs received in slots on the alarm system housing, a tapered pipe having a first end fastened to a horizontal exit joint on the T-housing and a second tapered end force fit into an exit pipe of a septic tank.

2 Claims, 19 Drawing Sheets

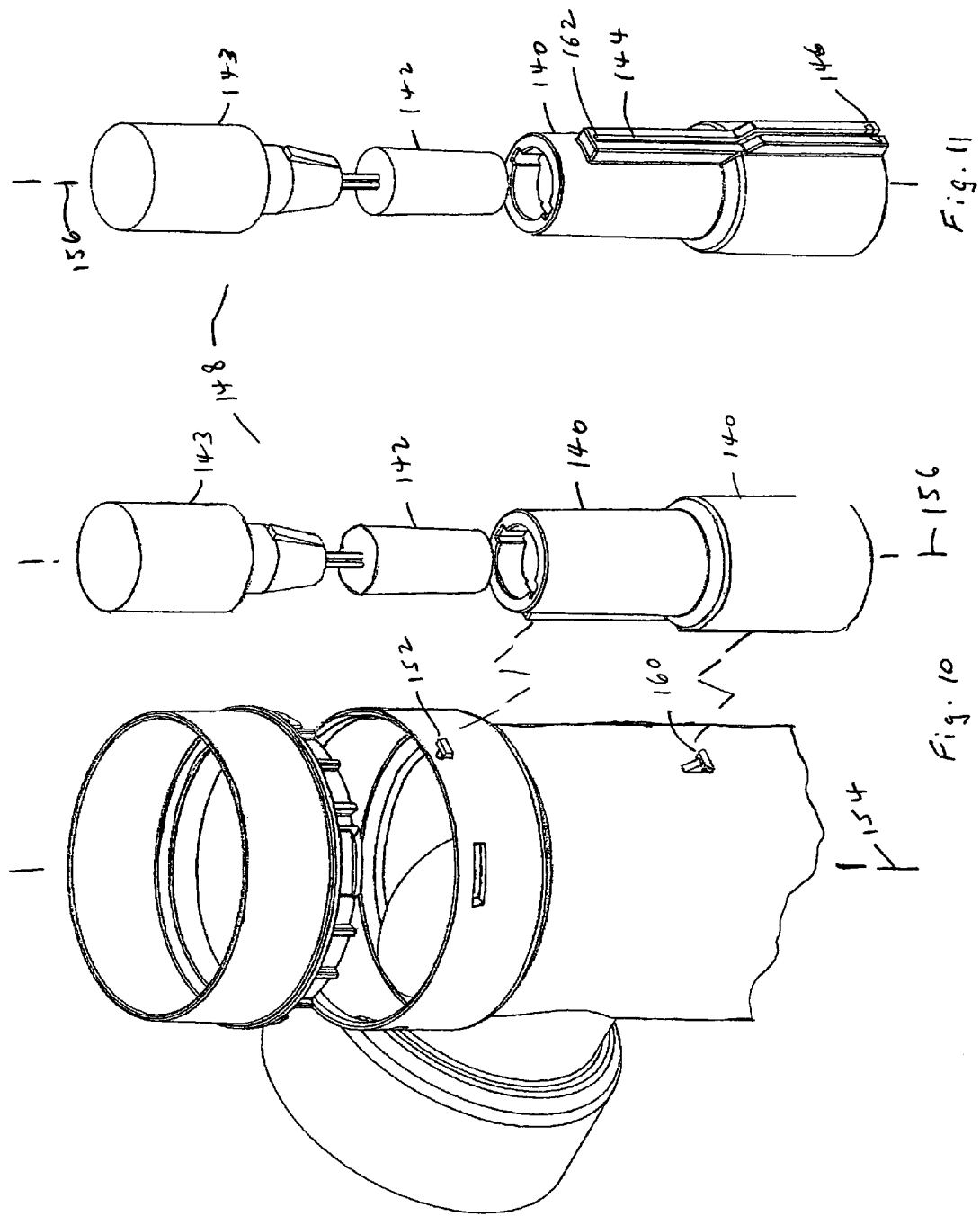

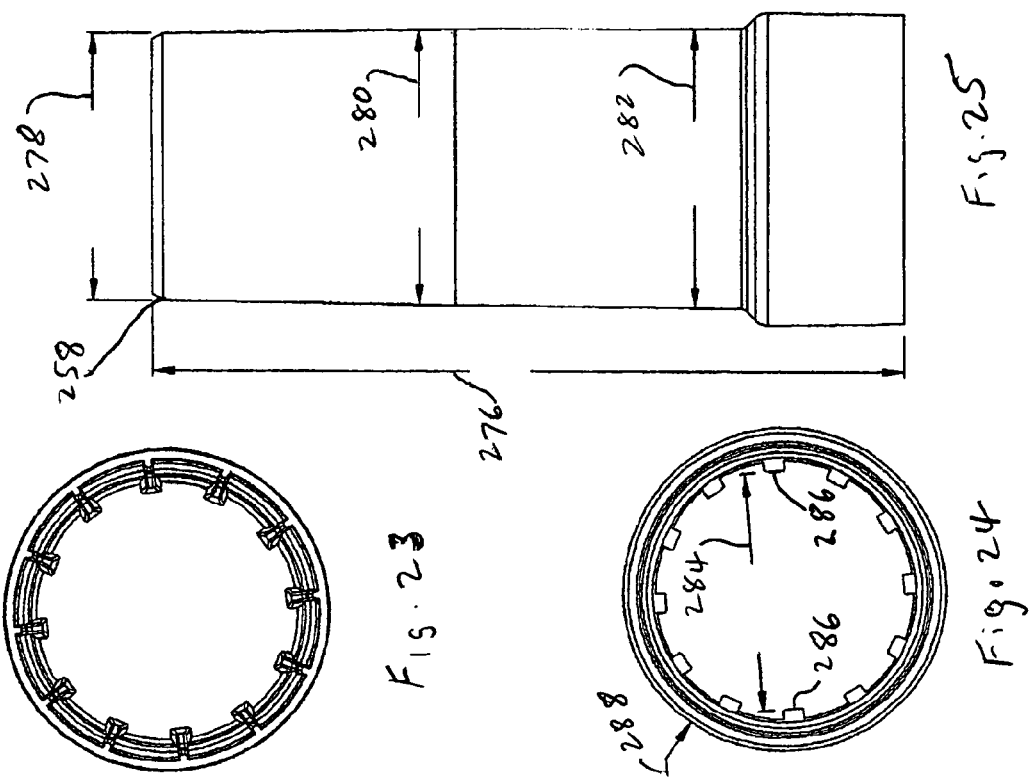
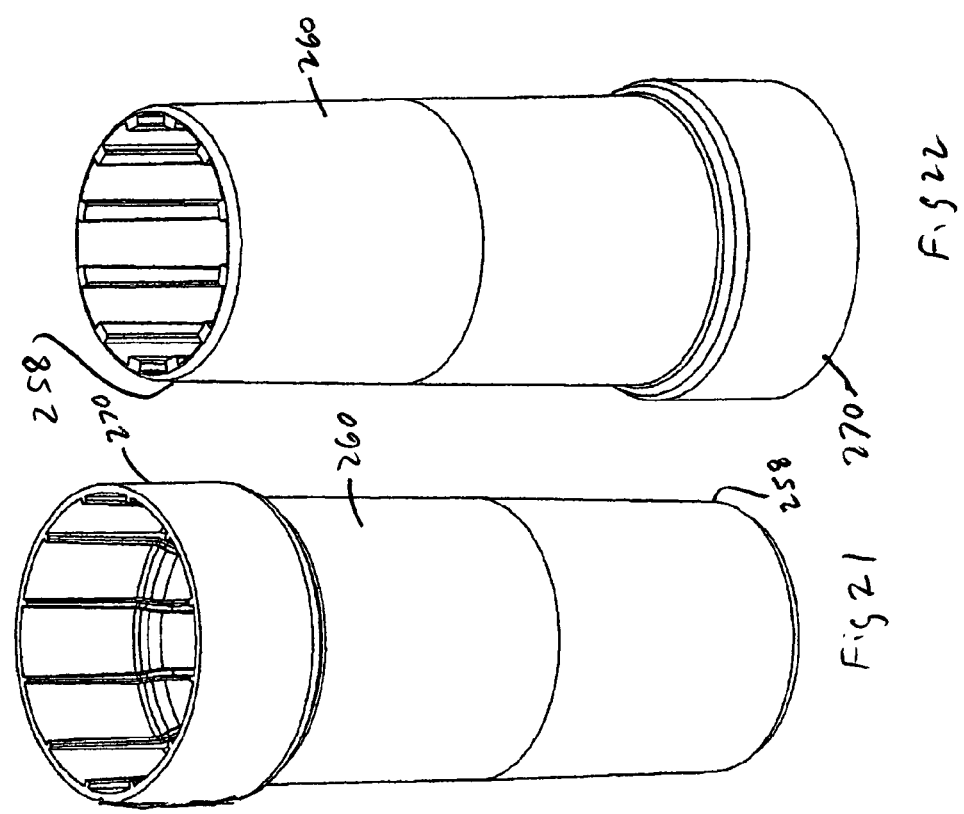

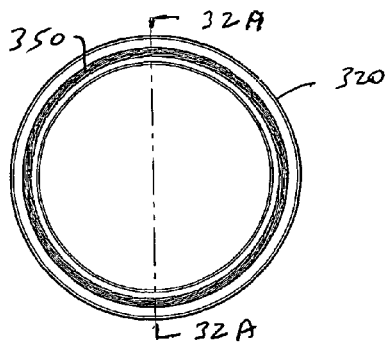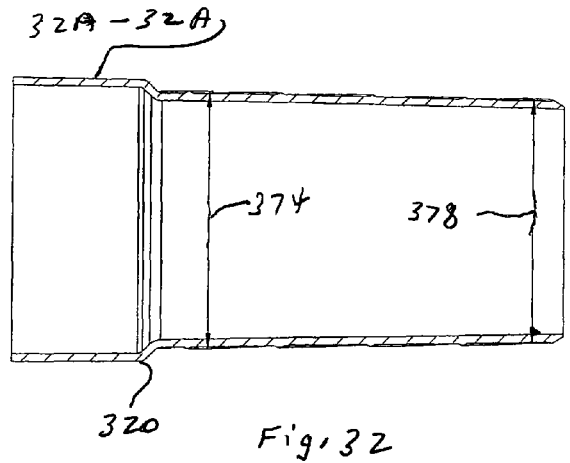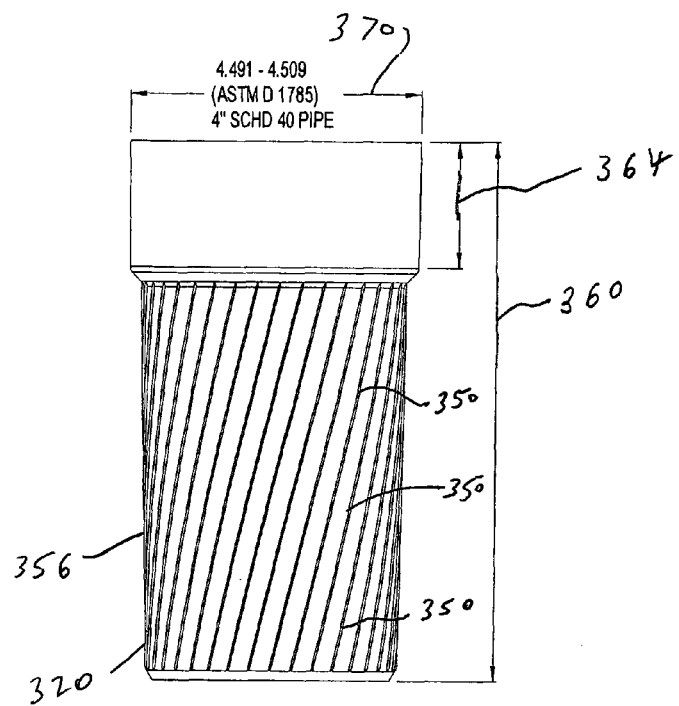

T-HOUSING FOR SEPTIC TANK

This application claims the benefit of U.S. Provisional Application No. 60/545,099 filed Feb. 17, 2004.

BACKGROUND OF THE INVENTION

1. Field of the Invention

This invention pertains to a T-housing system for a septic tank outlet. More particularly the invention pertains to filter retention within a vertical portion of the T-housing, an adaptor for filter retention, and liquid level sensor mounting on the vertical portion.

2. Description of the Prior Art

The prior art is described below with respect to FIGS. 1-4.

Tank 20 receives waste 22 from home sinks, toilets, etc. through inlet pipe 24. The waste is digested in the tank so that solids 26 fall to the bottom and liquid exits outlet pipe 34 by flowing upward 28 in the center of filter cartridge 30 within T-housing 32.

In some filter designs the liquid flows upward over the outside of the filter, through the sides of the filter to the center of the filter and from there to the exit pipe. The direction of liquid flow through the sides of the filter has no bearing upon the invention.

Filter cartridge 30 is loaded into the T-housing by removing cover 38 that contains water level sensor 40, and pushing the cartridge down in vertical tube portion 46 of the T-housing by handle 47 until outwardly elastically biased finger 44 snaps outward into exit tube 48 of the T-housing so that the finger 44, latched into exit tube 48, prevents the cartridge from being forced upward and outward of portion 46 by buoyancy of the filter with entrained waste particles and upward flow of the exiting liquid. The filter has an arrow mark on upper plate 50 to indicate to the installer person which way to position the filter about vertical axis 54 so that finger 44 lines up with exit tube 48. It is difficult to line up the filter properly in the field when the upper plate is contaminated with soil, mud, etc. and is being moved down into a subterranean hole.

SUMMARY OF THE INVENTION

It is one object of the invention to provide a multidirectional latch for a snap-in filter that is received in the T-housing.

It is another object of the invention to provide a snap-on cover for the T-housing.

It is another object of the invention to provide a rotate and lock attachment for a liquid level alarm system on an external side of the T-housing.

It is another object to provide a linear lock attachment for a liquid level alarm system on an external side of the T-housing.

It is another object of the invention to provide an element for attaching a T-housing to a dirty outlet pipe of a septic tank U.S. Provisional Application Ser. No. 60/545,099 filed Feb. 17, 2004 is hereby incorporated herein by reference in its entirety.

In accordance with the invention a T-housing for a septic system tank includes a vertical first tube having a first end, a second end and an axis, an exit tube for filtered waste extending laterally from a side of the first tube between the first end and the second end,
the first tube designed for receiving a filter cartridge having a top and a bottom, in the first tube by insertion of the cartridge through the first end,
the filter cartridge including outwardly resiliently biased means for catching on a surface that is transverse to the axis when the filter cartridge is in the first tube,
a first annular surface (76) extending radially inward from the first tube, spaced from the second tube and from the first end toward the second tube, facing toward the second end of the first tube,
the first annular surface being sufficiently continuous for receiving the resiliently biased means at any angle around a vertical axis of the first tube, for resisting vertical movement of the filter cartridge out of the first tube,
a second surface facing toward the first end, spaced from the first annular surface, extending radially inward from the first tube sufficiently for receiving a surface of the filter cartridge facing the second end when the filter cartridge is in the first tube and the first tube is receiving the resiliently biased means, for preventing movement of the second surface past the first annular surface. The first annular surface is preferably on a collar attached to the first tube. The second surface may be on the collar.

A T-housing for an outlet of a septic tank, the T-housing including:
a vertical first tube having a first end, a second end and an axis,
an exit tube for filtered waste, extending laterally from a side of the first tube between the first end and the second end,
the first tube designed for receiving a filter cartridge having a top and a bottom, in the first tube by insertion of the cartridge through the first end,
means for sensing liquid level attached to an outer side of the vertical first tube,
a plurality of catches on the outer side of the vertical first tube, and
a slot designed for receiving the catches, extending along a length of the means for sensing, for attaching the means for sensing to the T-housing,
twist-lock means for attaching the means for sensing to the outer side of the vertical first tube.

In a T-housing mounted on an outlet pipe extending through a wall of a septic tank, the T-housing including:
a vertical first tube having a first end, a second end and an axis,
an exit tube for filtered waste, extending laterally from a side of the first tube between the first end and the second end,
the first tube designed for receiving a filter cartridge having a top and a bottom in the first tube, by insertion of the cartridge through the first end,
a tapered pipe having a first end mounted in the exit tube and a second end mounted in the outlet pipe,
ribs extending longitudinally along a length of the tapered pipe, preferably the ribs being helical.

BRIEF DESCRIPTION OF THE DRAWINGS

In order that the invention be more fully comprehended, it will now be described, by way of example, with reference to the accompanying drawings, in which:

FIG. 10 is a schematic perspective view of a pair of catches disposed on the outer surface of a T-housing for mounting a liquid level alarm system on the outer surface of the T-housing according to the invention.

FIG. 11 is a schematic perspective view of the liquid level alarm system of FIG. 10, rotated to show the mounting slot for receiving the pair of catches, according to the invention.

FIG. 21 is a perspective view of a tapered pipe of the invention looking partially into an end that is adapted for attachment to the T-housing.

FIG. 22 is a perspective view of the tapered pipe of FIG. 21, looking partially into an end that is force fit by insertion into an outlet pipe of a septic tank.

FIG. 23 is an end view of the visible opening of the pipe of FIG. 21.

FIG. 24 is an end view of the visible opening of the pipe of FIG. 22.

FIG. 25 is a side view of the pipe of FIG. 21.

FIG. 30 is a side view of the pipe of FIG. 29.

FIG. 31 is an end view of the pipe of FIG. 30.

FIG. 32 is a cross section view taken along 32A-32A of the pipe of FIG. 30.

DESCRIPTION OF THE PREFERRED EMBODIMENTS

Figure 1:
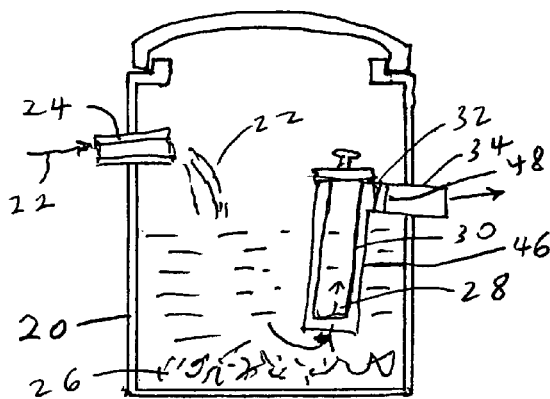
FIG. 1 is a schematic perspective view of a prior art conventional T-housing outlet in a tank.
Figure 3:
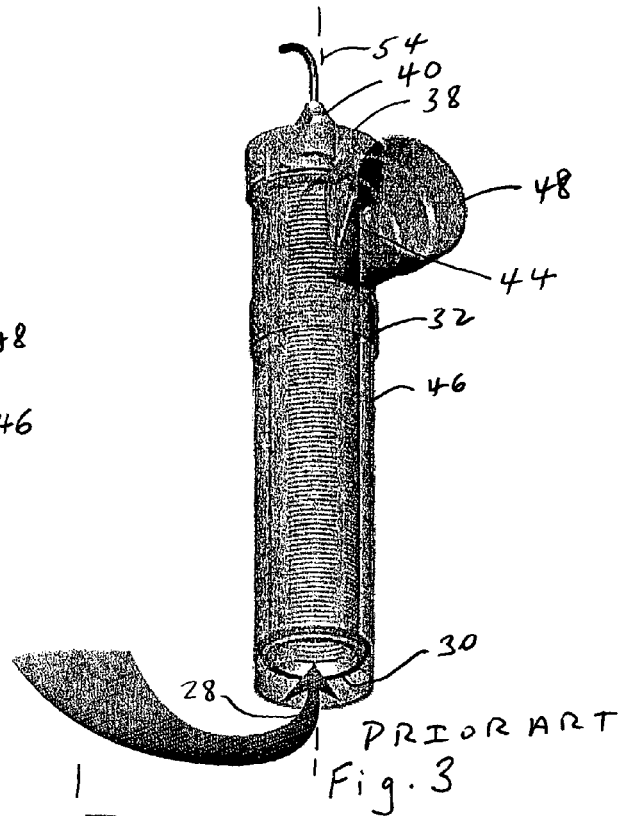
FIG. 3 is a schematic perspective view of a prior art conventional assembly of the filter of FIG. 2, mounted in the housing of FIG. 1. A handle at the top of the housing in FIG. 1 is replaced in FIG. 3 with an electrical overflow sensor and wire exiting therefrom.
Figure 2:
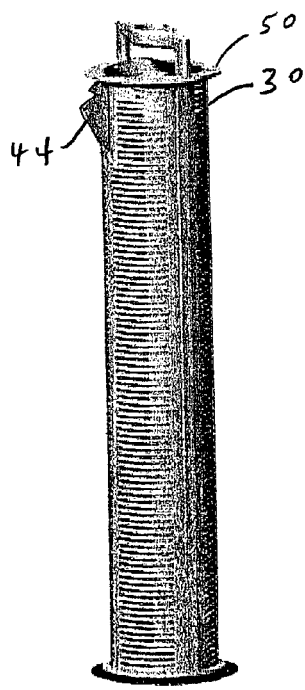
FIG. 2 is a perspective view of a prior art conventional filter designed for installation in a T-housing.
Figure 4:
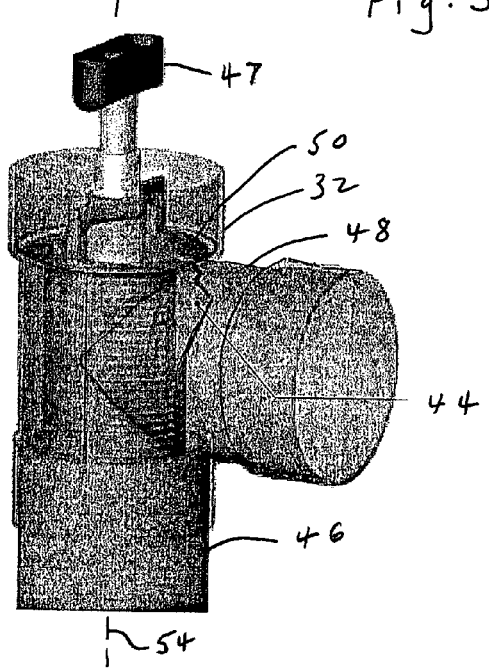
FIG. 4 is a schematic perspective view of the prior art conventional latching of the filter latch arm of a filter into the tee of a T-housing.

Before explaining the invention in detail, it is to be understood that the invention is not limited in its application to the detail of construction and arrangement of parts illustrated in the drawings since the invention is capable of other embodiments and of being practiced or carried out in various ways. It is also to be understood that the phraseology or terminology employed is for the purpose of description only and not of limitation.

Figures 5, 6:
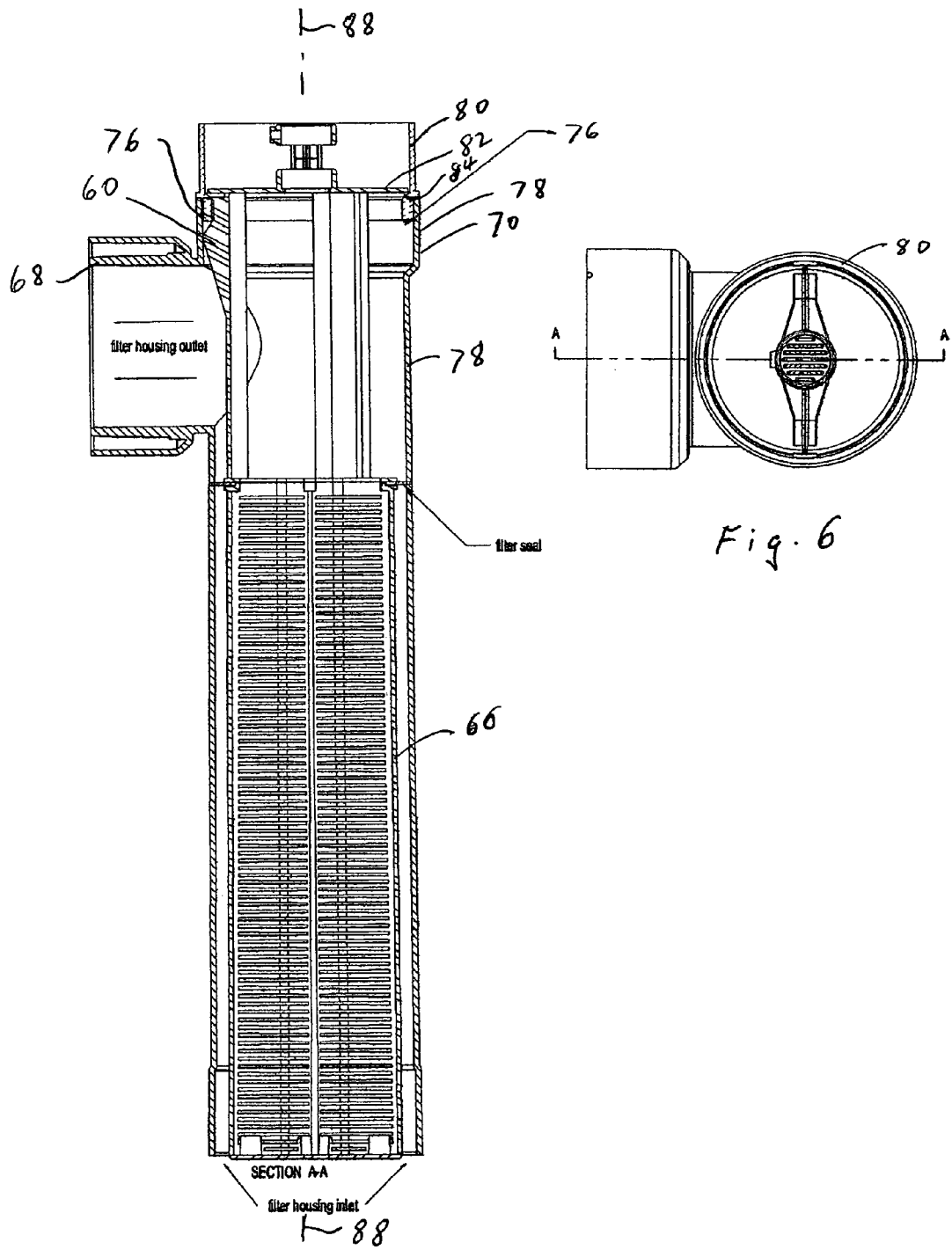
FIG. 5 is a cross sectional view of a filter latch arm on a filter engaging a multidirectional latch collar of a T-housing according to the invention.
FIG. 6 is a top view of the T-housing and filter of FIG. 5.

Referring to the drawings:

In FIGS. 5 and 6, collar 80 is inserted into and fastened to vertical tube 78.

Finger 60 of filter 66 comprises resilient means for urging the finger radially outward. Preferably the finger is a resilient molded portion of the filter. Finger 60 is sprung radially outward above exit tube 68 of T-housing 70. The filter is prevented from moving upward and outward of vertical tube 78 by finger 60 contacting annular surface 76 that extends radially inward from vertical tube 78 of T-housing 70. Annular surface 76 is provided by collar 80 which extends downward into vertical tube 78.

When filter 66 is loaded into the T-housing, it is pushed downward until the installer person hears or feels the click of finger 60 springing radially outward past the bottom of collar 80.

In FIG. 5, the finger lines up with exit tube 68. The filter is prevented from moving further downward into exit tube 68 by upper plate 82 of the filter resting on the upper surface of radially inward depending shoulder 84 of collar 80.

Figure 7:
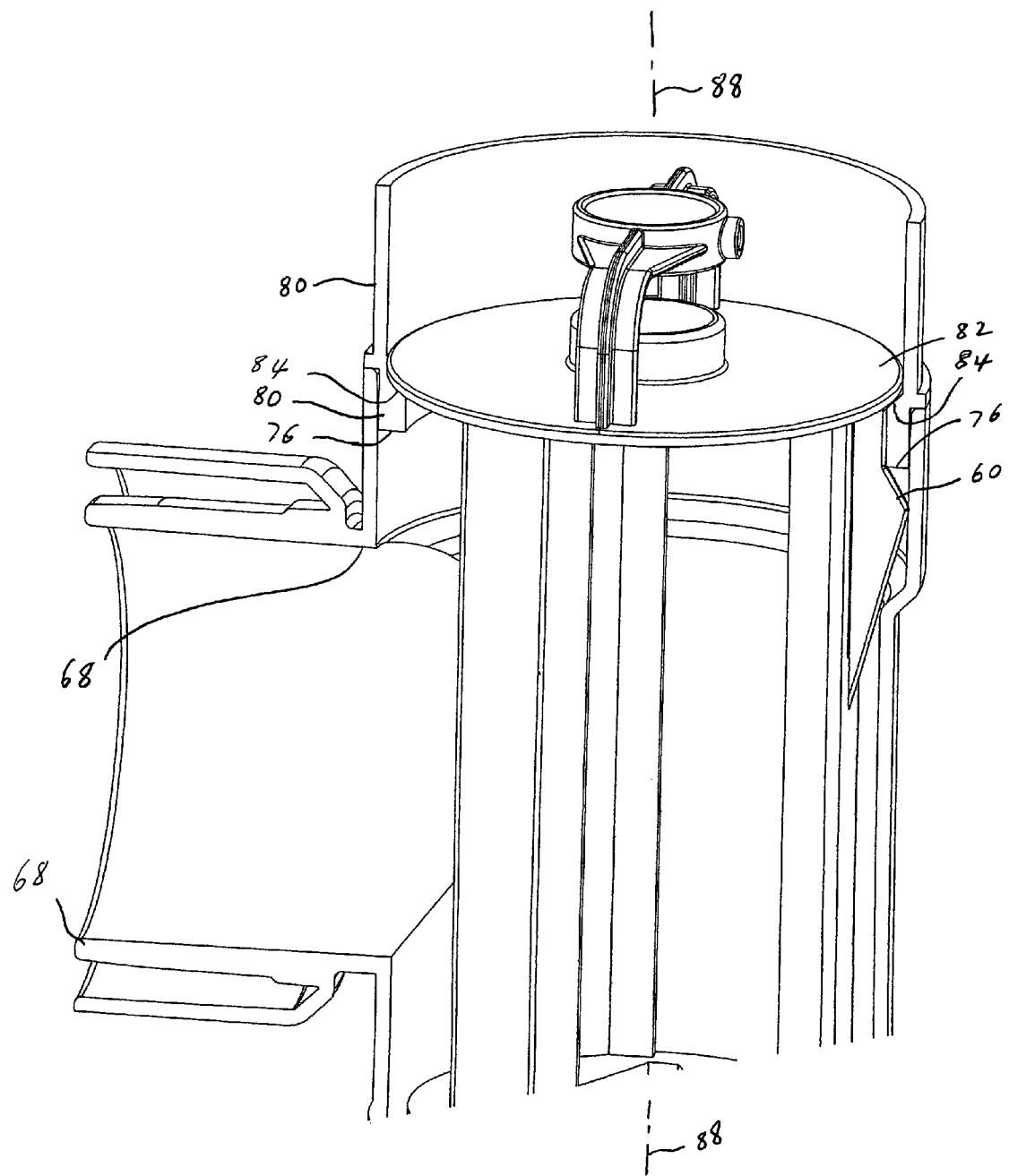
FIG. 7 is a schematic cross section enlarged view of a filter latch arm of a filter engaging a multidirectional latch collar in another direction according to the invention.

When the filter is inserted at any angle about vertical axis 88, as for example in FIG. 7, the finger will conveniently spring radially outward under collar 80 even when the finger is not lined up vertically with exit tube 68.

The filter can be removed for cleaning or replacing by drawing it out manually with greater upward force than the filter would receive from the liquid in the tank.

Figures 8, 9:
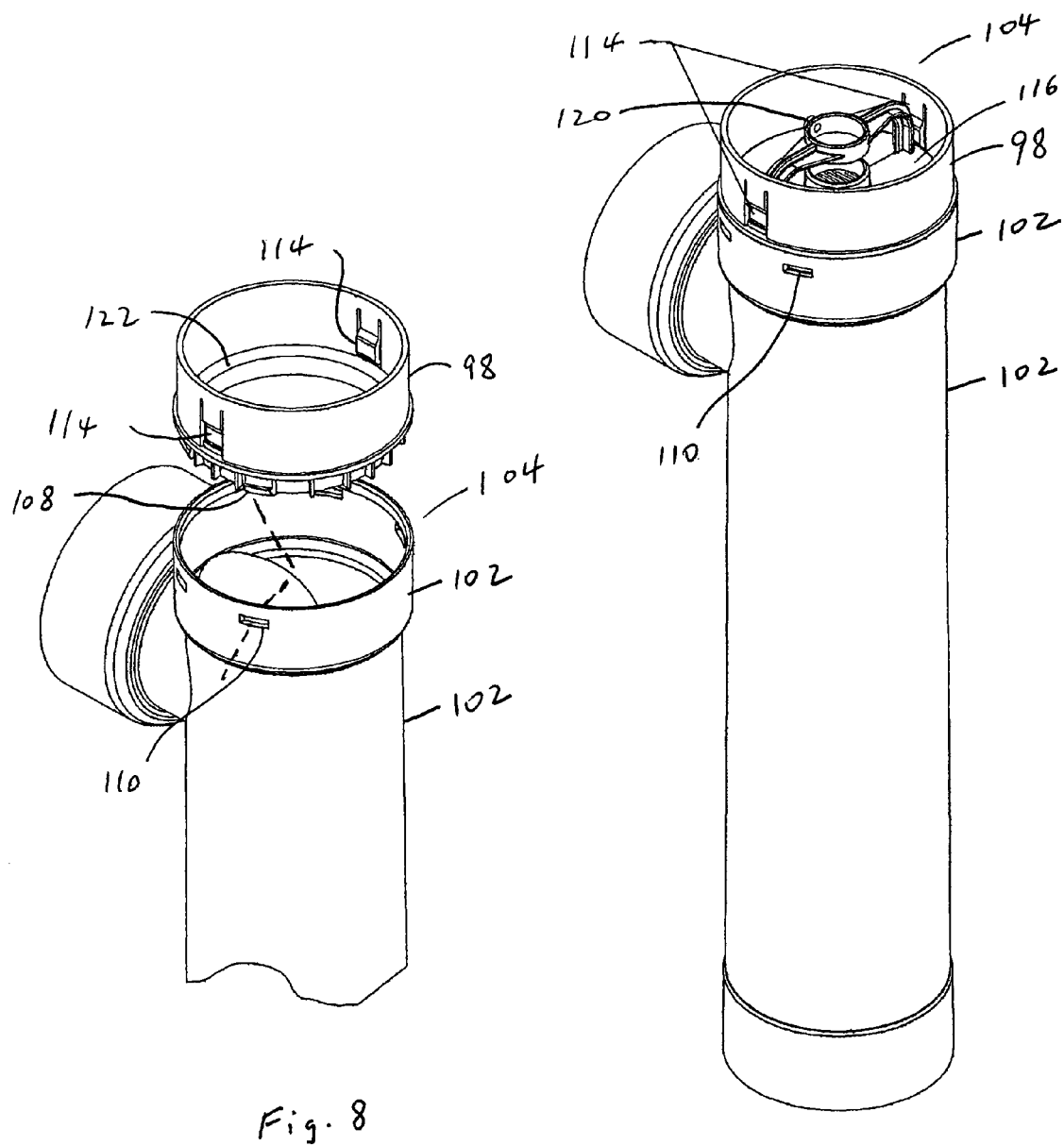
FIG. 8 is a schematic perspective view of a filter latch, snap-on filter retention collar according to the invention.
FIG. 9 is a schematic perspective view of the filter latch, snap-on filter retention collar of FIG. 8, latched over the upper seal plate of a filter, according to the invention.
Figure 12:
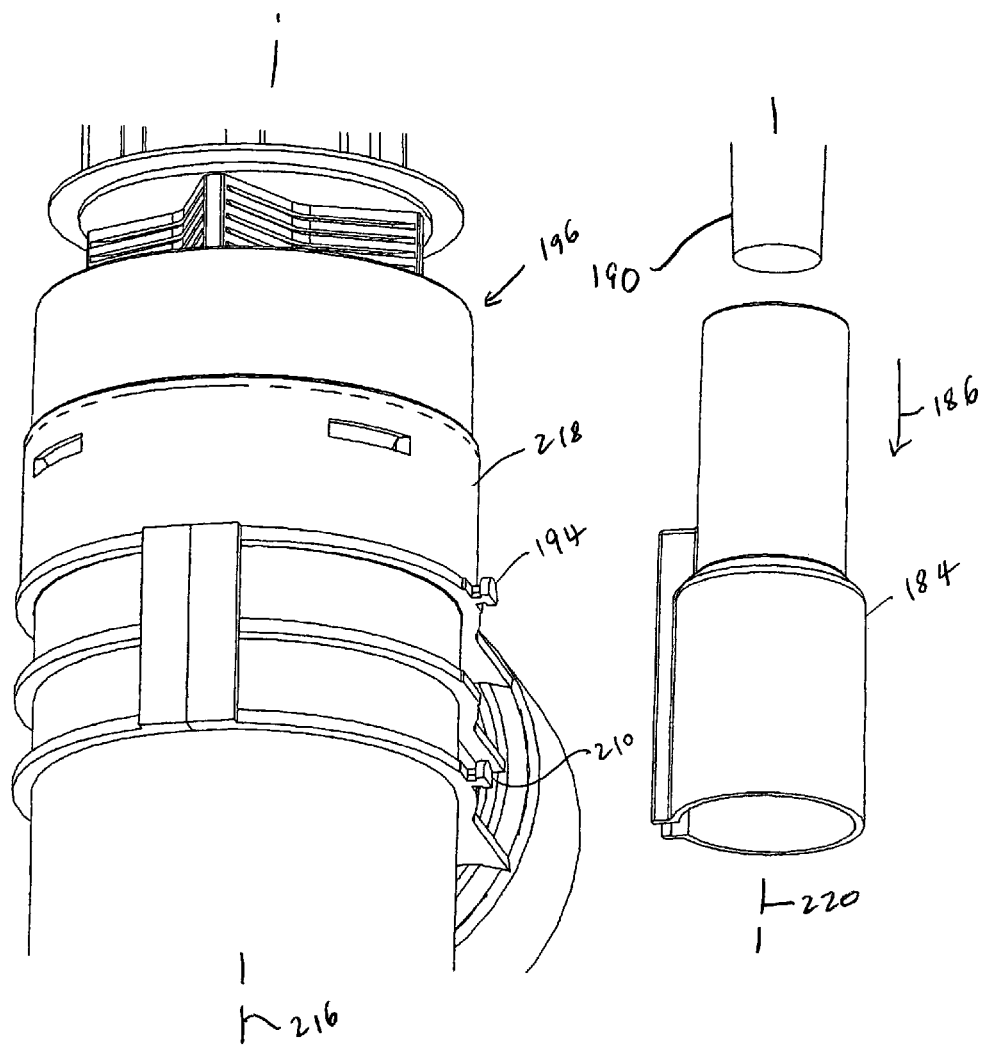
FIG. 12 is a schematic perspective view of a pair of catches disposed on the outer surface of a T-housing for mounting a liquid level alarm system on the outer surface of the T-housing and a sensor according to the invention.
Figure 13:
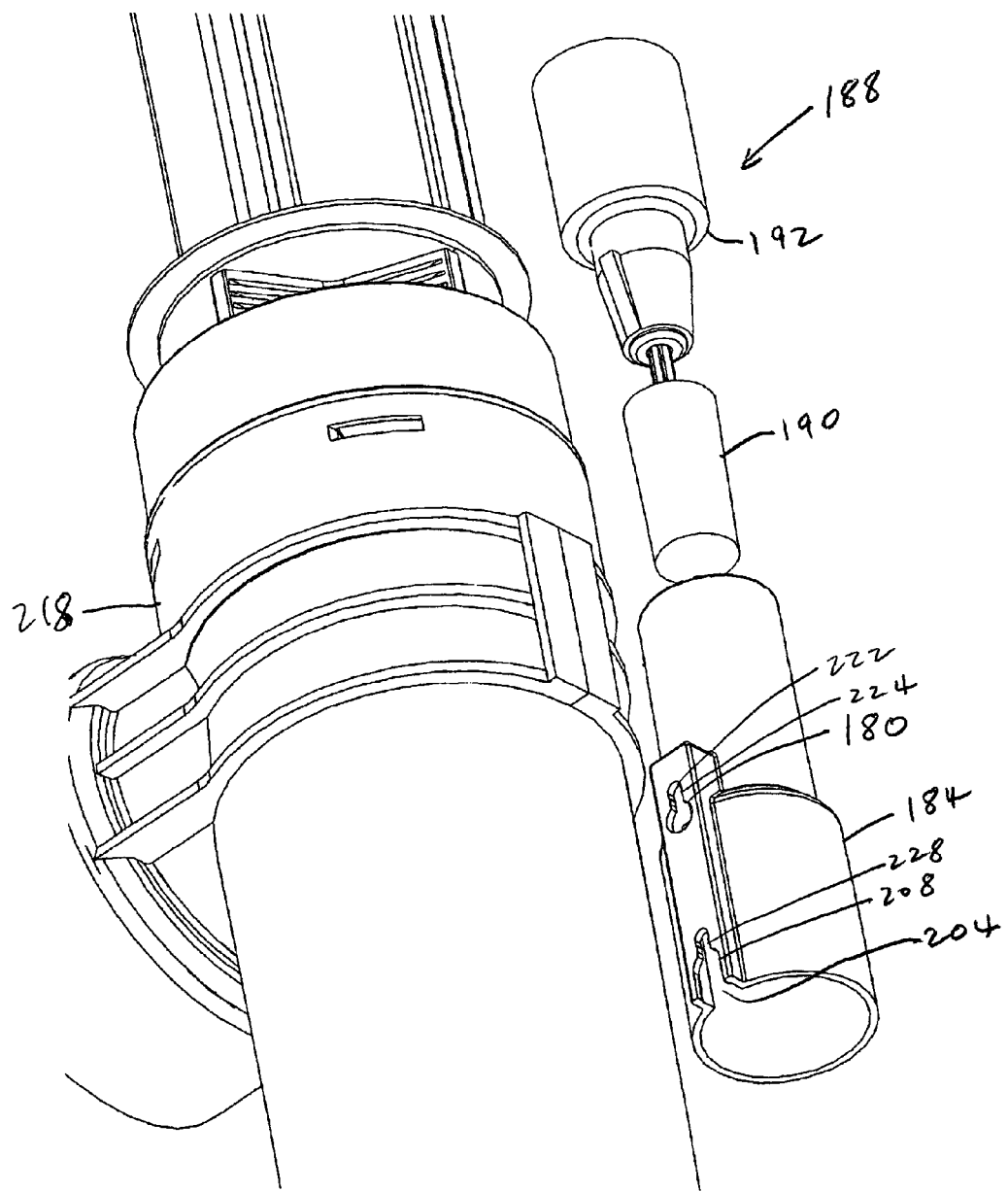
FIG. 13 is a schematic perspective view of the T-housing and liquid level alarm system of FIG. 12, rotated to show the mounting slot for receiving the pair of catches, according to the invention.
Figure 14:
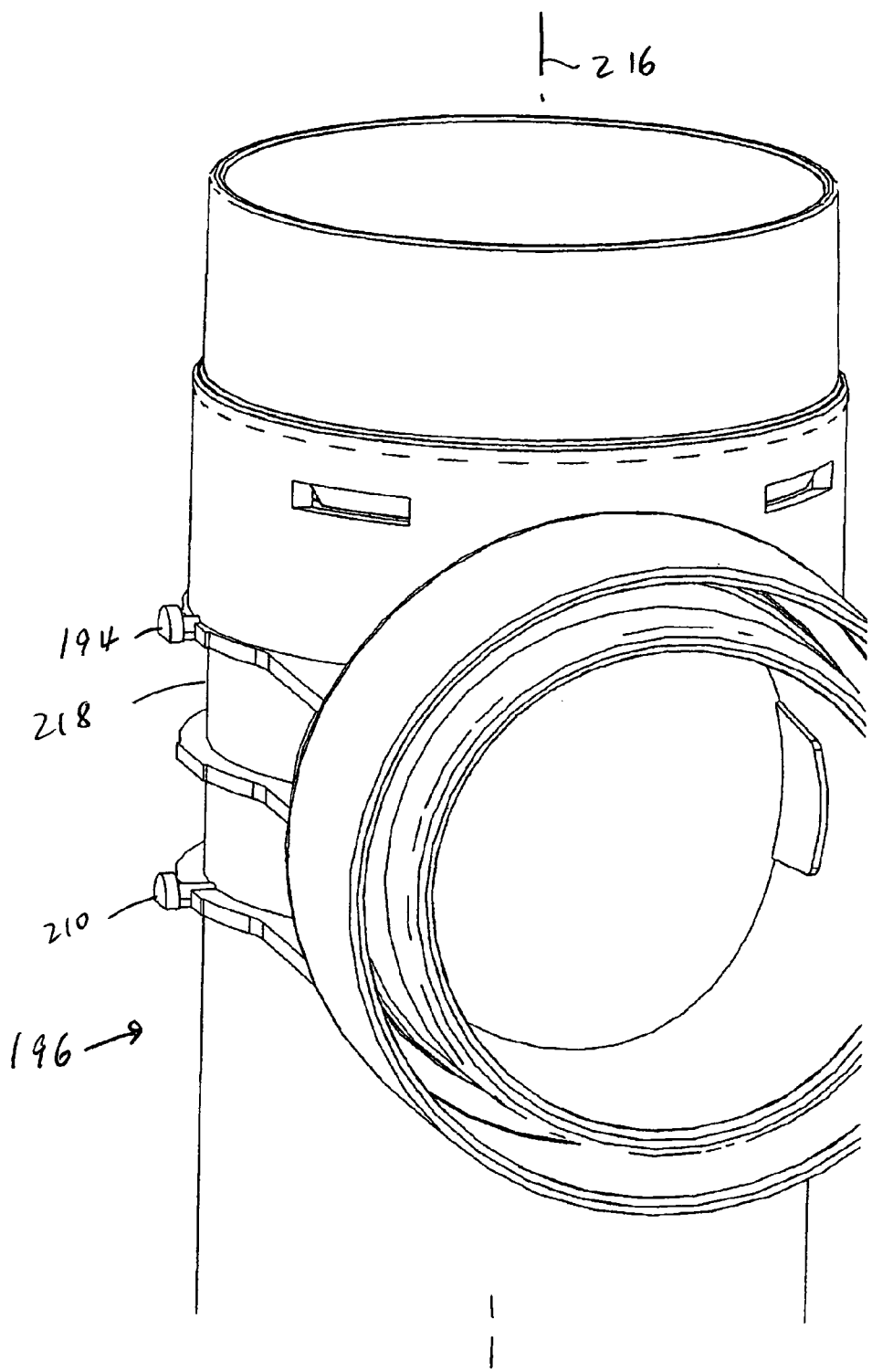
FIG. 14 is a schematic perspective view of the T-housing of FIG. 12 rotated to show an opposite side of the catches.
Figure 15:
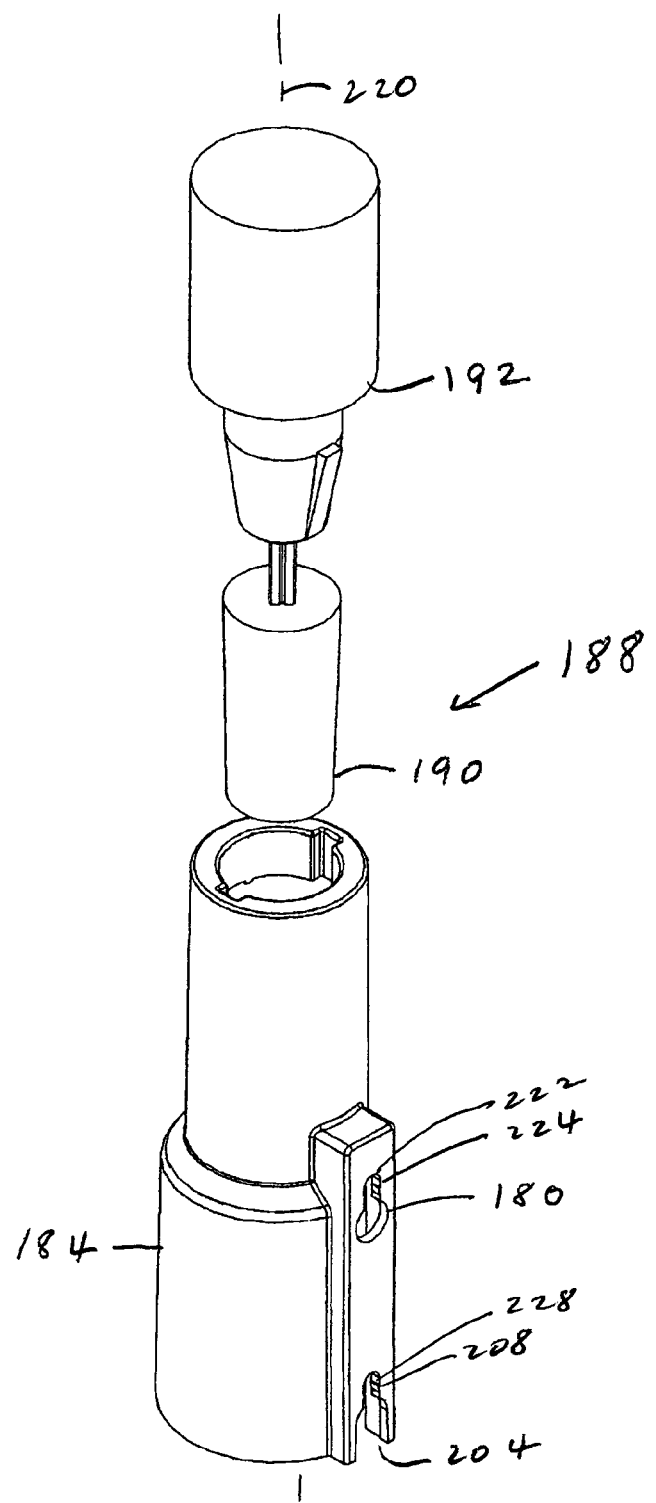
FIG. 15 is a schematic perspective view of the liquid level alarm system of FIG. 13, rotated to show an opposite side of the mounting slot.

In FIGS. 8 and 9, collar 98 snaps into vertical tube 102 of T-housing 104 by way of a plurality of resilient fingers 108 on collar 98 springing radially outward into a plurality of radially open slots 110 in tube 102.

When filter 120 is installed in T-housing 104 by inserting the filter downward into vertical tube 102, upper plate 116 of the filter passes the plurality of resilient fingers 114 which spring radially inward, snapping over the top of plate 116 so that they prevent the plate and filter from being forced upward and outward of vertical tube 102 by liquid in the tank. Downward movement of the plate is halted by the plate coming to rest on radially inward depending shoulder 122 on collar 98.

The filter can be removed for cleaning or replacing by drawing it out manually with greater upward force than the filter would receive from the liquid in the tank.

In FIGS. 10 and 11, vertical slot 144 on housing 140 of liquid level alarm system 148 comprising float 142 and transponder 143 that twist lock into the housing, is designed to receive horizontal stud or catch 152 when the housing is held horizontally and moved radially inward toward axis 154 and onto the catch.

When catch 152 is in the slot, the housing is rotated vertically so that axis 156 is parallel to axis 154, and the lower portion of housing 140 is moved toward horizontal catch 160 until stud or catch 160 enters horizontal slot portion 146 of slot 144.

Housing 140 is then slid downward until top end 162 of slot 144 rests on catch 152 which is locked in slot 144 so that catch 160 is also locked in slot 144.

In FIGS. 12-15, eye 180 on housing 184 of liquid level alarm system 188 comprising float 190 and transponder 192 is designed to receive upper catch 194 on T-housing 196, and open ended 204 eye 208 is designed to receive lower catch 210 on the T-housing when housing 184 is held vertically and moved radially inward toward axis 216 of the T-housing vertical filter receiving tubular portion 218, so that axis 220 of system 188 is parallel to axis 216.

Housing 184 is then slid downward 186 until top end 222 of vertical slot 224 of eye 180 rests on catch 194 which is locked in eye 180 by slot 224, so that catch 210 is locked in vertical slot 228 of lower eye 208.

Figure 16:
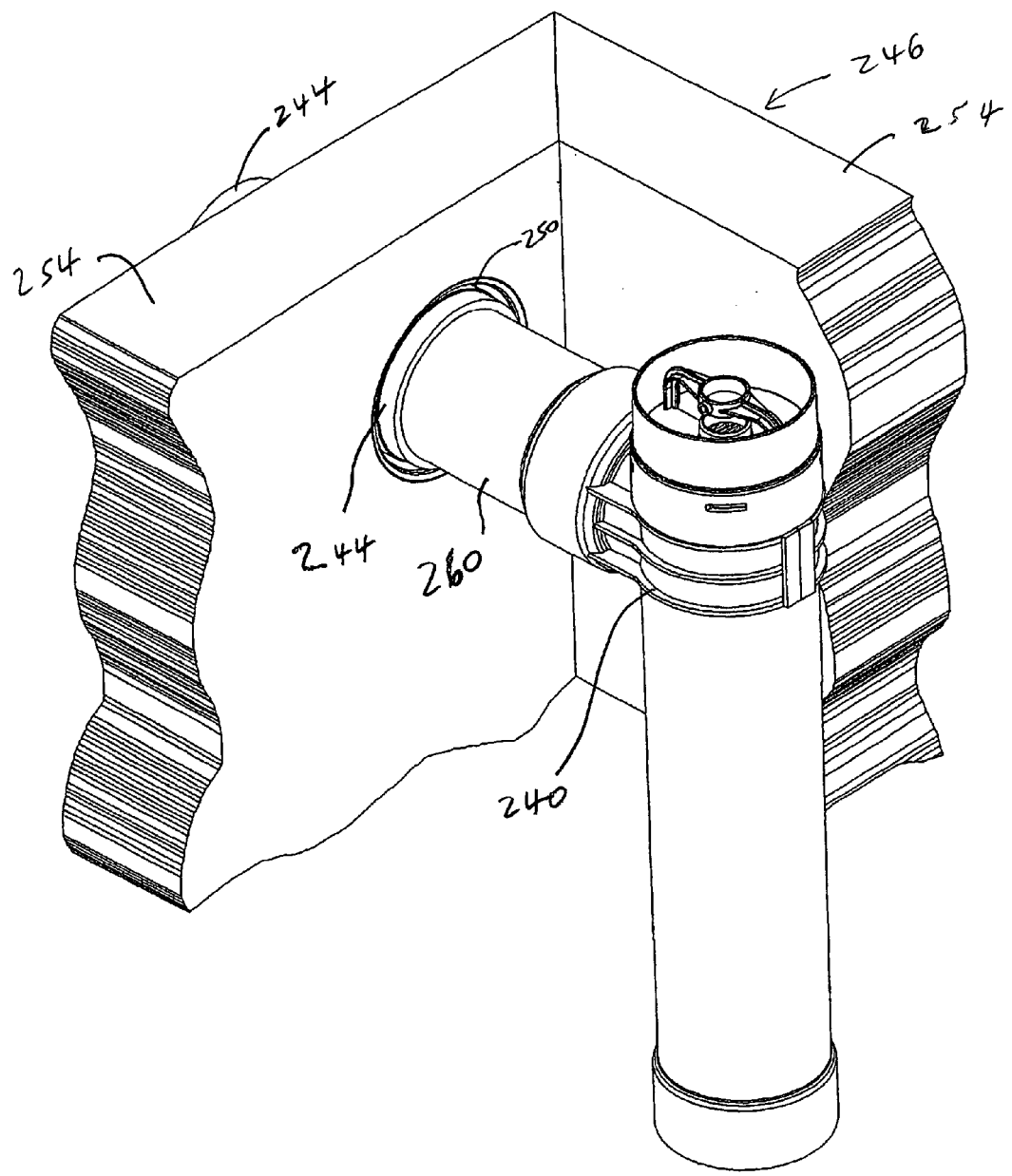
FIG. 16 is a schematic perspective side view of a T-housing of the invention connected by a tapered pipe of the invention to a conventional outlet pipe mounted in a wall of a septic tank. The septic tank is shown in partial view.
Figure 17:
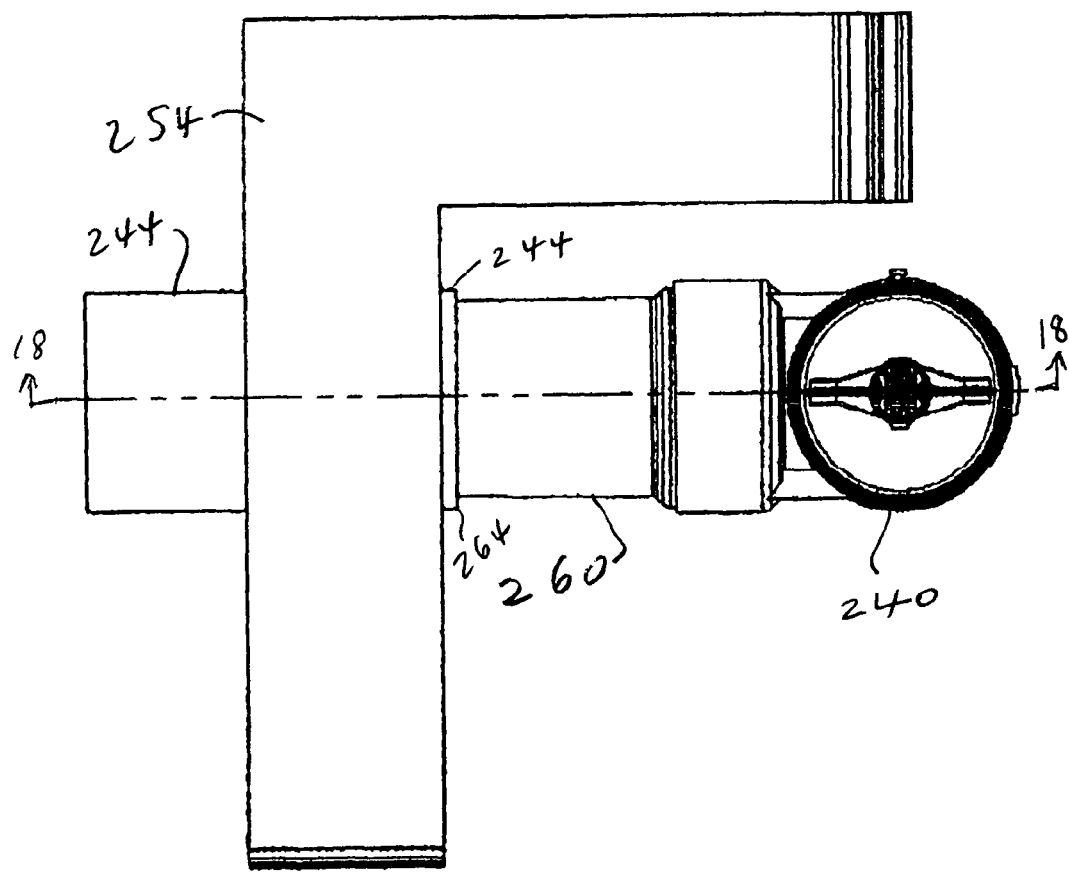
FIG. 17 is a top view of the T-housing assembly of FIG. 16.
Figure 18:
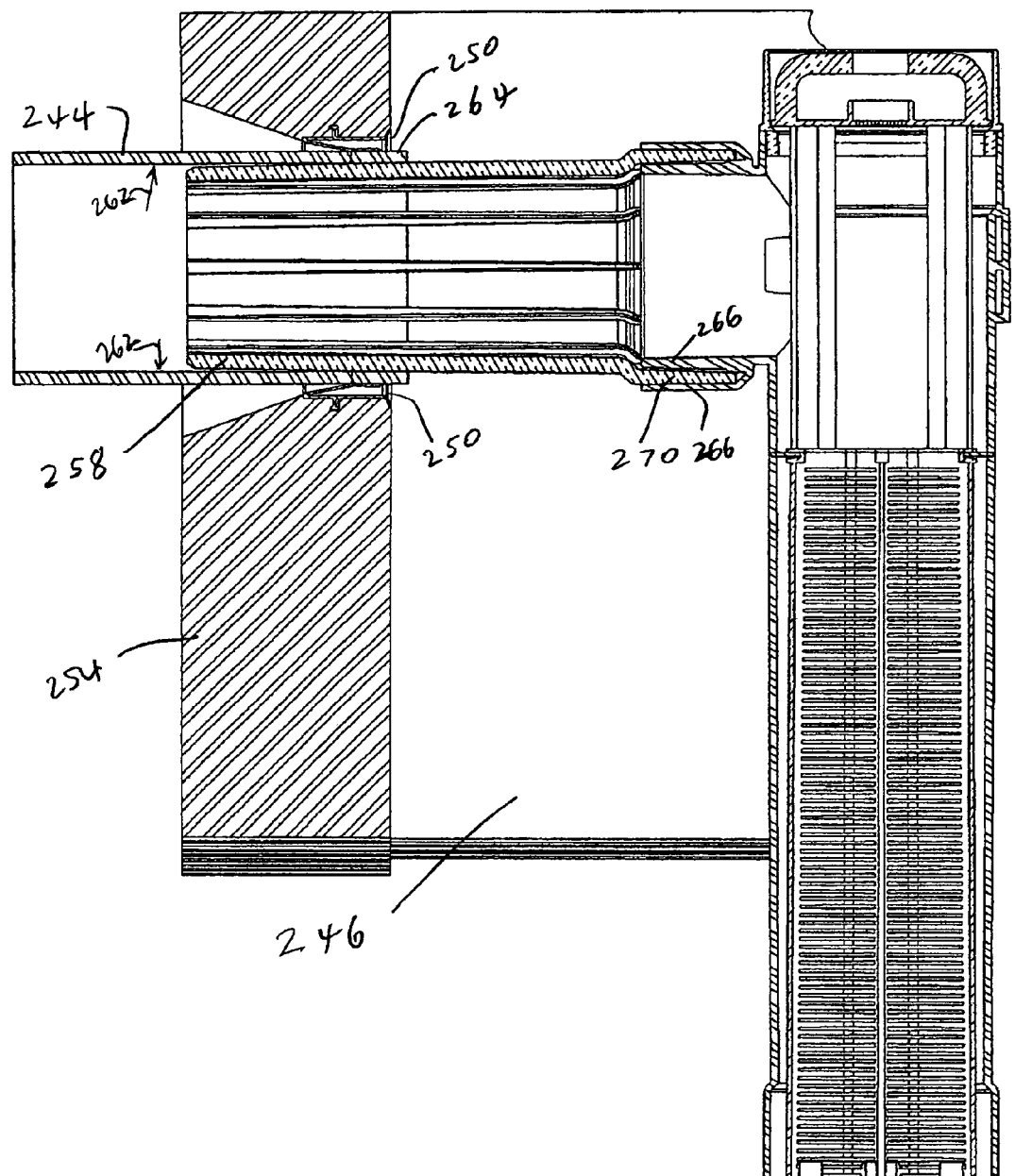
FIG. 18 is a cross section view of the T-housing assembly of FIG. 17 taken along 18-18.

In FIGS. 16-18, conventional generally cylindrical outlet pipe 244 extends through conventional rubber seal 250 that is cast into concrete wall 254 of a septic tank 246. T-housing 240 of the invention is connected to outlet pipe 244 by pipe 260 of the invention.

In the prior art, the T-housing is attached to the outlet pipe by slipping T-housing outlet pipe joint 266 onto portion 264 of the outlet pipe 244 and gluing them together. It is difficult to make the attachment of joint 266 to portion 264 because portion 264 is short and often contaminated by dirt.

According to the invention, end 258 of pipe 260 is slipped into portion 264 and forced into portion 264 as far as pipe 260 will go. Although glue can be used, pipe 260 is tapered and the radial outward force 262 of the taper on portion 264 provides friction grip that, without a need for glue, prevents the pipes from parting.

End 270 of pipe 260 which is clean, is glued into joint 266.

Figure 19:
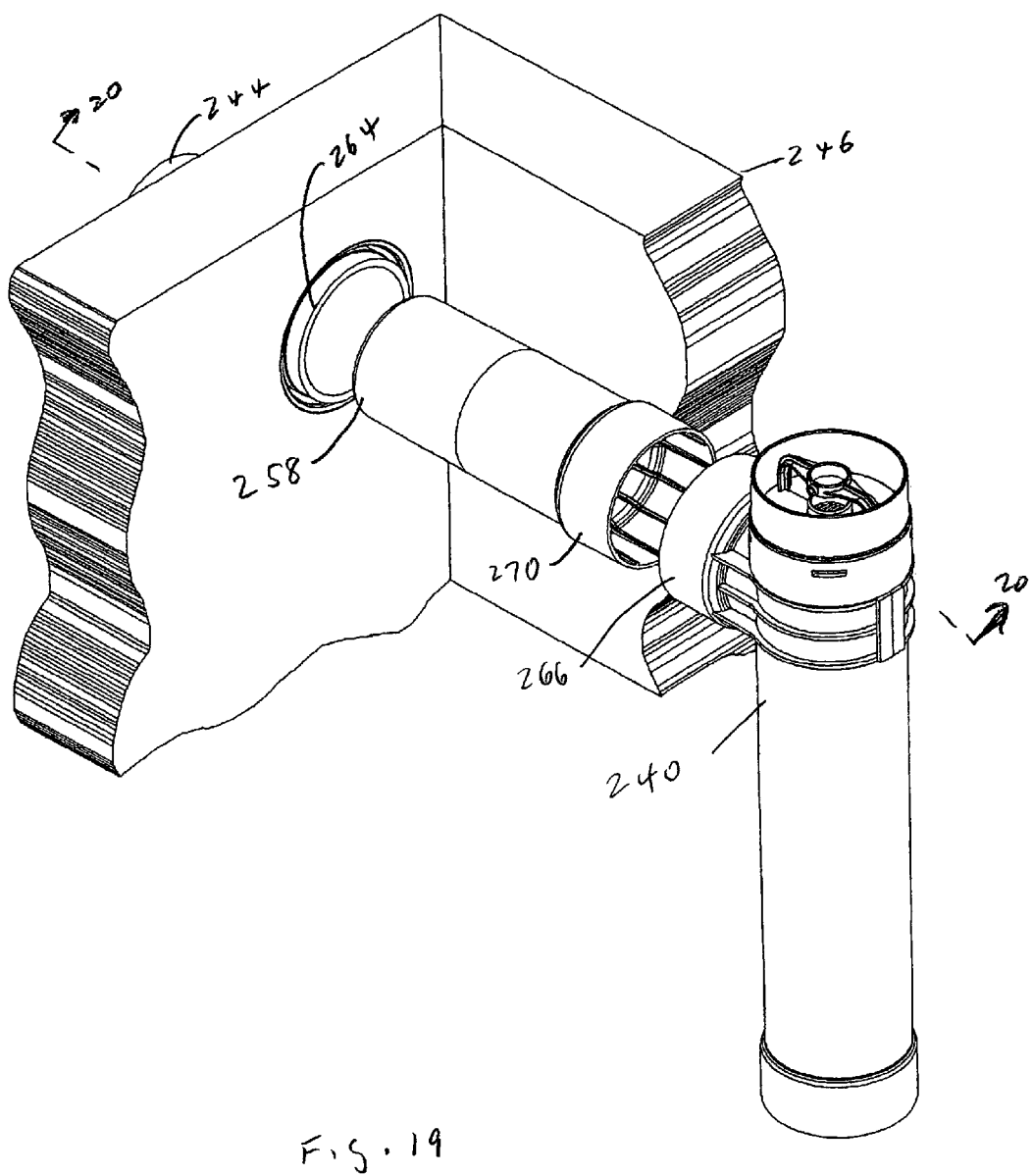
FIG. 19 is a schematic perspective view of the T-housing assembly of FIG. 16 wherein the elements are separate before assembly.
Figure 20:
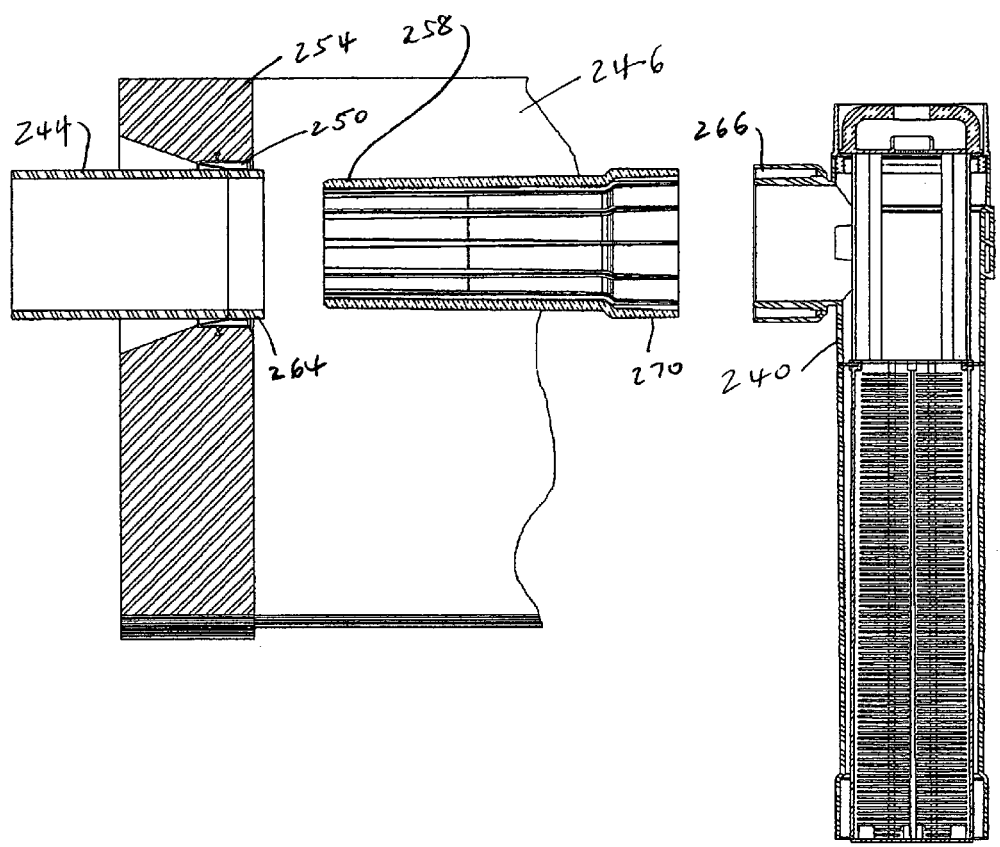
FIG. 20 is a schematic cross section view of the T-housing assembly of FIG. 18 wherein the elements are separate before assembly.
Figure 26:
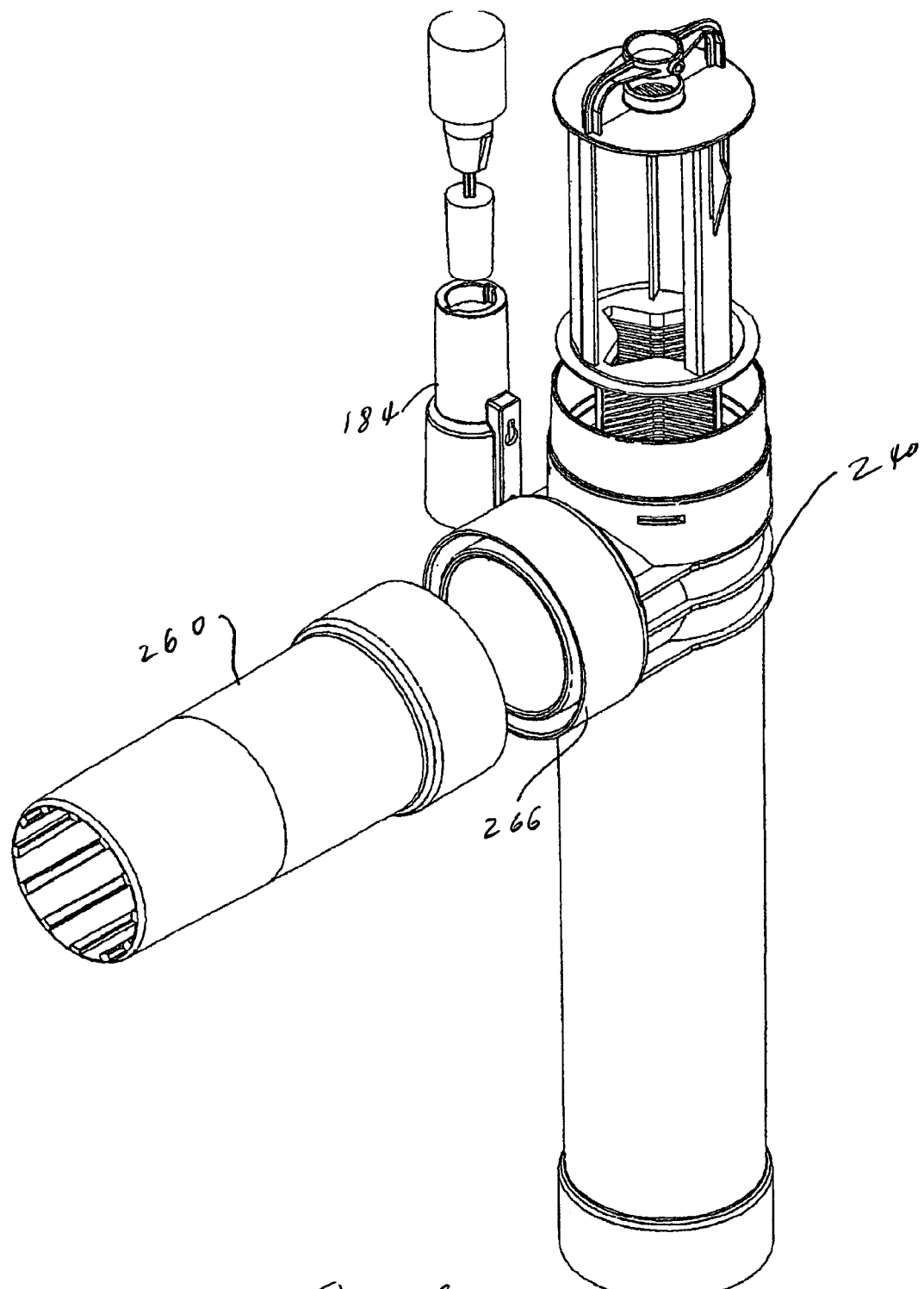
FIG. 26 is a perspective schematic exploded view of the T-housing, level sensor and tapered pipe of the invention.

FIGS. 19 and 20 show pipes 244, 260, and joint 266 separated before installation of the T-housing in the septic tank.

Referring to FIGS. 21-25, pipe 260 is preferably tapered at two different tapers to accommodate more than one diameter septic tank outlet pipe.

Preferably pipe 260 is made of ABS plastic although construction of the pipe is not limited to being ABS plastic. One example of a pipe 260 according to the invention is ABS, volume 20.14 cubic inches, weight 12 ounces, length 276 10.500 inches, diameter 278 3.875 inches, diameter 280 4.017 inches, diameter 282 4.087 inches, inner diameter 284 between ribs 286 3.344 inches, diameter 288 4.533 inches.

Figure 27:
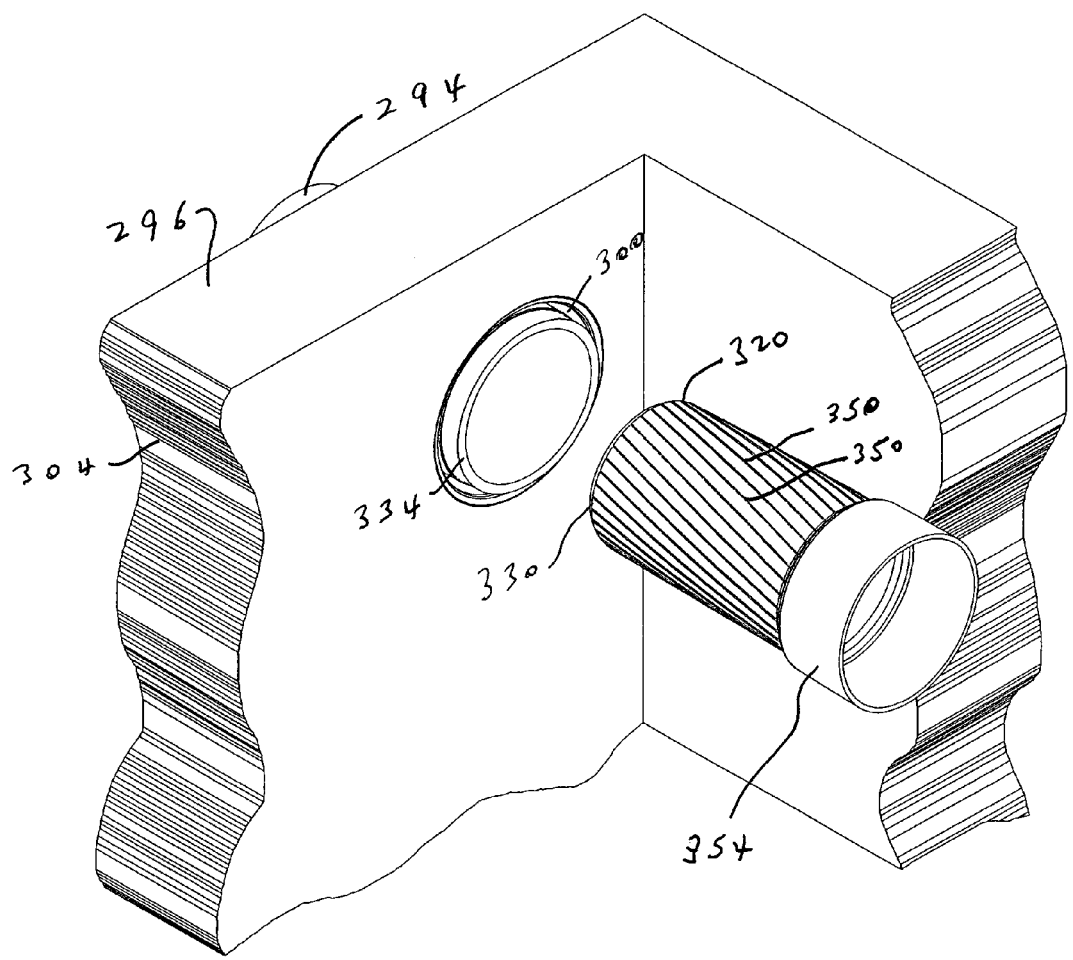
FIG. 27 is a schematic perspective side view of a tapered pipe of the invention for mounting in a conventional outlet pipe mounted in a wall of a septic tank. The septic tank is shown in partial view. The tapered pipe is shown separate from the outlet pipe before assembly.
Figure 28:
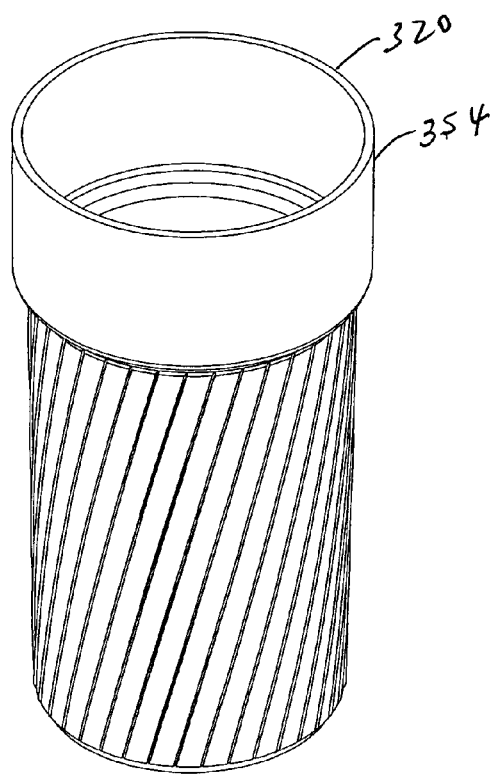
FIG. 28 is a perspective side view of the tapered pipe of FIG. 27 looking partially into an end that is adapted for attachment to the T-housing.
Figure 29:
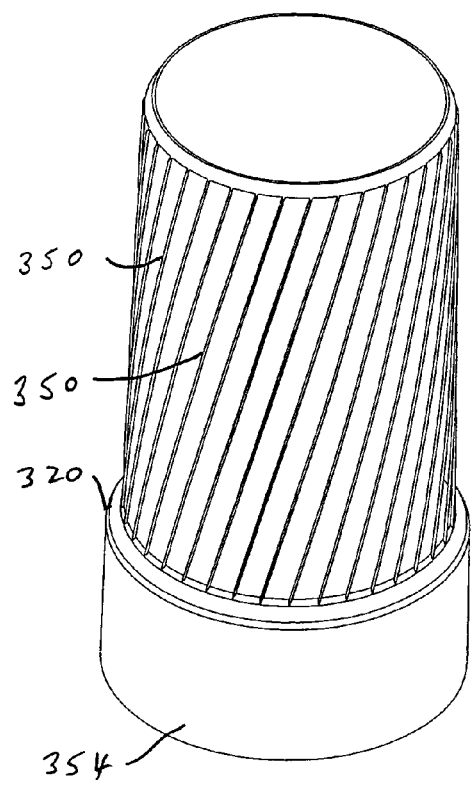
FIG. 29 is a perspective view of the tapered pipe of FIG. 28, looking partially into an end that is force fit by insertion into an outlet pipe of a septic tank.

In FIG. 27, conventional generally cylindrical outlet pipe 294 extends through conventional rubber seal 300 that is cast into concrete wall 304 of septic tank 296. In the invention, pipe 310 of the invention is designed to connect a T-housing to outlet pipe 294.

According to the invention, end 330 of pipe 320 is slipped into portion 334 of pipe 294 and forced into portion 334 as far as pipe 320 will go. Although glue can be used, pipe 320 is tapered and the radial outward force of the taper on portion 334 provides friction grip reinforced by helical ribs 350 that, without a need for glue, prevents the pipes from parting.

End 354 of pipe 320 is glued into a T-housing outlet joint.

Referring to FIGS. 28-32, pipe 320 is preferably tapered at two different tapers to accommodate more than one diameter septic tank outlet pipe. Tapered diameter 354 provides a locking fit into the inner diameter of 4" pipe.

Pipe 320 is PVC, dimensions 360 8.57", 364 2.00", 370 (ASTM) D 1785) 4" SCHD 30 Pipe, 374 4.125", 378 3.875.

Although the present invention has been described with respect to details of certain embodiments thereof, it is not intended that such details be limitations upon the scope of the invention. It will be obvious to those skilled in the art that various modifications and substitutions may be made without departing from the spirit and scope of the invention as set forth in the following claims.

DRAWING DESIGNATORS (INFORMAL LIST)

20 tank
22 waste
24 pipe, inlet
26 solids
28 upward, flow
30 filter cartridge
32 T-housing
34 pipe, outlet
38 cover
40 sensor
44 finger
46 vertical tube
47 handle
48 exit tube
50 plate, upper
54 axis
60 finger
66 filter
68 exit tube
70 T-housing
76 annular surface
78 tube, vertical
80 collar
82 upper plate
84 shoulder
88 axis
98 collar
102 vertical tube
104 T-housing
108 finger
110 slot
120 filter
116 upper plate
114 finger
122 shoulder
140 housing
142 float
143 transponder
144 slot, vertical
146 slot, horizontal
148 alarm system
152 catch, horizontal
154 axis
156 axis
160 catch, horizontal
162 top end
180 eye
184 housing of alarm system 188
186 downward, direction arrow
188 alarm system
190 float
192 transponder
194 catch, upper
196 T-housing
204 open end
208 eye
210 catch, lower 216 axis, T-housing
218 vertical filter receiving tubular portion
220 axis of alarm system 188
222 top end of slot 224
224 slot, vertical
228 slot, vertical
240 T-housing
244 outlet pipe of septic tank 246
246 septic tank
250 seal, rubber
254 wall of septic tank
258 end of pipe 260
260 pipe of the invention
262 force, radial outward, arrows
264 portion of outlet pipe 244
266 joint, outlet pipe, T-housing
270 end of pipe 260
276 length
278 diameter
280 diameter
282 diameter
284 diameter
286 ribs
288 diameter
294 outlet pipe
296 septic tank
300 rubber seal
304 concrete wall
310 pipe
320 pipe
330 end of pipe 320
334 portion
350 helical ribs
354 end of pipe 320
356 tapered diameter
360 dimension 8.57"
364 dimension 2.00"
370 (ASTM D 1785) 4" SCHD 30 Pipe
374 4.125"
378 3.875"

What is claimed is:

1. A septic tank outflow system, comprising:
    a T-housing outlet joint connected to a filter disposed in a septic tank system;
    a pipe fitting having a first open end joined with said T-housing outlet joint and a second open end;
    said first open end of said pipe fitting having a first diameter and said second open end of said pipe fitting having a second diameter that is smaller than said first diameter;
    said pipe fitting having a body extending from said first open end of said pipe fitting to said second open end of said pipe fitting and having a cross-sectional diameter that is tapered in a single direction from said first diameter to said second diameter;
    said body of said pipe fitting further having longitudinally extending helical raised ribs extending upwardly from surfaces of said body; and
    said body of said pipe fitting being friction fit within an outlet pipe of said septic tank system thereby joining said T-housing outlet joint with said outlet pipe.

2. The septic tank outflow system according to claim 1, wherein said T-housing outlet joint includes a wall having an annular recess and wherein said first open end is joined with said T-housing outlet joint in said annular recess with an adhesive material.

\* \* \* \* \*